United States Patent [19]

Robinson

[11] Patent Number: 5,107,113
[45] Date of Patent: Apr. 21, 1992

[54] METHOD AND APPARATUS FOR CORRECTING DISTORTIONS IN SCANNING TUNNELING MICROSCOPE IMAGES

[75] Inventor: Robert S. Robinson, Red Bank, N.J.

[73] Assignee: Bell Communications Research, Inc., Livingston, N.J.

[21] Appl. No.: 633,754

[22] Filed: Dec. 26, 1990

[51] Int. Cl.$^5$ .............................................. H01J 37/00
[52] U.S. Cl. ....................................... 250/306; 250/307
[58] Field of Search .................... 250/306, 307, 423 R

[56] References Cited

U.S. PATENT DOCUMENTS

| | | | |
|---|---|---|---|
| 4,057,722 | 11/1977 | Heike | 250/311 |
| 4,321,468 | 3/1982 | Kimura | 250/307 |
| 4,424,450 | 1/1984 | Ward et al. | 250/492.2 |
| 4,455,572 | 6/1984 | Malden | 358/242 |
| 4,518,898 | 5/1985 | Tarnowski et al. | 315/371 |
| 4,851,674 | 7/1989 | Kobayashi | 250/311 |
| 4,907,287 | 3/1990 | Homma et al. | 382/54 |
| 4,967,271 | 10/1990 | Campbell et al. | 358/105 |

OTHER PUBLICATIONS

"Image Processing Techniques for Obtaining Registration Information with Scanning Tunneling Microscopy," Wilson & Chiang, Journal of Vacuum Science Technology, vol. A6, pp. 398–400, Mar./Apr. 1988.

"Scanning Tunneling Microscopy of Machined Surfaces", Gehrtz et al., Journal of Vacuum Science Technology, vol. A6, pp. 432–435, Mar./Apr. 1988.

"Observation of Microfabricated Patterns by Scanning Tunneling Microscopy", Okayama et al., Journal of Vacuum Science Technology, vol. A6, pp. 440–444, Mar./Apr. 1988.

"Improving the Linearity of Piezoelectric Ceramic Actuators," Newcomb & Flinn, Electronics Letters, vol. 18, No. 11, pp. 442–444, May 1982.

*Primary Examiner*—Bruce C. Anderson
*Attorney, Agent, or Firm*—Leonard Charles Suchyta

[57] ABSTRACT

A computer based image correction system for Scanning Tunneling Microscopes (STMs) caused by the non-linear, time-dependent behavior of piezoelectric transducers used in STMs to acquire the image. The correction process operates on a digitized stored STM image. A subset of the stored image scan lines are selected for processing. Each scan line is shifted and stretched according to the values of selected parameters. Adjacent scan lines are shifted and stretched in the direction the scan line was acquired. Adjacent scan lines are compared pixel by pixel and the differences are determined. The user is presented with a representation of the differences. The selected parameter values are varied until the differences between adjacent scan lines can best be minimized. The parameter values that best minimized the differences are then applied using the above process to the whole image. The result is an image with the distortions introduced by the piezoelectric transducers removed.

12 Claims, 5 Drawing Sheets

5,107,113

METHOD AND APPARATUS FOR CORRECTING DISTORTIONS IN SCANNING TUNNELING MICROSCOPE IMAGES

TECHNICAL FIELD

This invention relates to Scanning Tunneling Microscopes (STM), and more specifically to image correction systems for STMs, including such STMs where distortion in the images is due to the non-linear, time dependent behavior of the electromechanical transducers used in STMs to acquire the image.

BACKGROUND OF THE INVENTION

Scanning Tunneling Microscopes (STMs) use the concept of vacuum tunneling to image topographic features of metal and semiconductor surfaces to atomic scale resolution. This is accomplished by scanning an atomically sharp tip close to the surface of the sample to be studied. A tip-to-sample voltage is introduced causing a tunneling current to flow across the gap between the scanning tip and surface under study when the gap is sufficiently small. The tunneling current varies exponentially in relation to changes in the gap width. In most STMs the tip is scanned parallel to the surface (in the X-Y plane) by means of X and Y piezoelectric transducers and the tip-to-sample distance or gap is controlled by a third Z axis piezoelectric transducer. A feedback system senses the tunneling current and maintains this current constant by electrically actuating the Z axis piezoelectric transducer. The use of the feedback system allows the tip to follow the surface profile of the sample. The feedback voltage used to actuate the Z axis piezoelectric transducer varies in relation to the scanned profile. By systematically scanning adjacent lines in the X-Y plane (as in television scanning) and outputting the feedback voltage, an electronic image of the surface can be obtained. The first STMs displayed images either as traces on an oscilloscope screen or as tracings on electronic chart recorders. Increasing sophistication of STMs has brought digitization and computerization to image capture, storage, and display.

Piezoelectric materials change their mechanical shape when placed in an electric field. As such, these materials are useful when fashioned into devices for high precision motor control; the X, Y, & Z axis transducers identified above are examples. However, these materials exhibit time dependent behavior in response to a change to an applied electric field. One component of this behavior is known in the art as "creep" in which the dimensions of the transducer continue to change for some time after a change in the applied field. A second component of this behavior is the non-linear response of the piezoelectric transducers to an applied voltage. It is these two components that result in the distortion of STM images. The apparent scan position of the tip will lag the actual position by an amount that increases with the length of each scanned line. For scanning tunneling microscopy, this displacement lag has a significant impact on the quality of the image because the precise positioning of the tip is critically important in developing an image with accurate dimensions and quality resolution. The result is an apparent decrease in feature dimensions related to the location of the feature in the direction of the scan and length of the scan line.

To try to compensate for the distortions introduced in the image, some STMs are configured to discard parts of the data. This is sometimes accomplished by collecting image data in only one direction of the STM's lateral scan. The acquisition of image data ceases at the end of one scan line and the tip returned to the starting x coordinate position of the next scan line before beginning image acquisition of the next scan line. This prior art approach does not prevent distortion but masks the distortion because when all scan lines are scanned in the same direction each line is distorted in an identical fashion. Another disadvantage of this approach is that the scanner probe has to traverse the surface twice for every scan line recorded, drastically reducing the image acquisition rate. Other methods (Wilson and Chiang, "Image Processing Techniques for Obtaining Registration Information with STM" Journal of Vacuum Science Technology, vol. A6, pp. 398, 1988; Gehrtz, et al., "STM of Machined Surfaces", Journal of Vacuum Science Technology, vol. A6, pp 432, 1988) take advantage of the natural symmetry in some surfaces and involve modifying the image until the proper symmetry is obtained. However, the disadvantage of this prior art approach is that the accuracy of these methods can only be assured when scanning surfaces with regular repeating structures, which are uncommon in long scan (>100×100 nm) STM work.

A calibration method (Okayama, et al., "Observation of Microfabricated Patterns by STMs", Journal of Vacuum Science Technology, vol A6, pp. 440, 1988) has also been used. However, a drawback of this method is that it requires complex circuitry to adjust the image based on the scan speed and length of the scan. Circuitry has been added (Newcomb and Flynn, "Improving the Linearity of Piezo-Electric Ceramic Actuators", Electronics Letters, vol 18, pp. 442, 1982) to improve linearity, but this also adds complexity to the electronics and its success depends on choice of piezoelectric material. Therefore it is an objective of the present invention to provide a means for image correction without the penalties associated with the methods defined above.

SUMMARY OF THE INVENTION

The present invention involves a computer based image correction system for scanning tunneling microscopy. The scanning tip acquires image data on adjacent scan lines with the scanning tip moving in opposite directions. This aspect of the invention provides the image acquisition system with the capability of a much higher image acquisition rate. Distortion in captured digitized STM images is corrected by shifting and stretching scan lines according to the values of selected parameters. The difference in information content of adjacent points (pixels) on adjacent scan lines is determined. The values of selected parameters used to shift and stretch the scan lines are modified until the difference between adjacent pixels on adjacent scan lines is effectively minimized. The result is a correct STM image.

In accordance with aspects of my invention, I introduce distortion in the scan image to be displayed on an output screen to compensate for distortion introduced into the image by the mechanical distortion inherent in the scanning tunneling microscope and I permit the correction of the images to be done iteratively, by successive selection of these parameters, with the derminative element being the minimization of differences between adjacent scan lines. Thus, in accordance with another aspect of my invention, I not only improve the speed of performance by utilizing scan lines in both directions but take advantage of the observation that the distortion in each scan line is complementary to the distortion in the adjacent alternate direction scan lines.

BRIEF DESCRIPTION OF THE DRAWINGS

FIG. 5 should be placed adjacent to FIG. 4.

DETAILED DESCRIPTION

Figure 1:
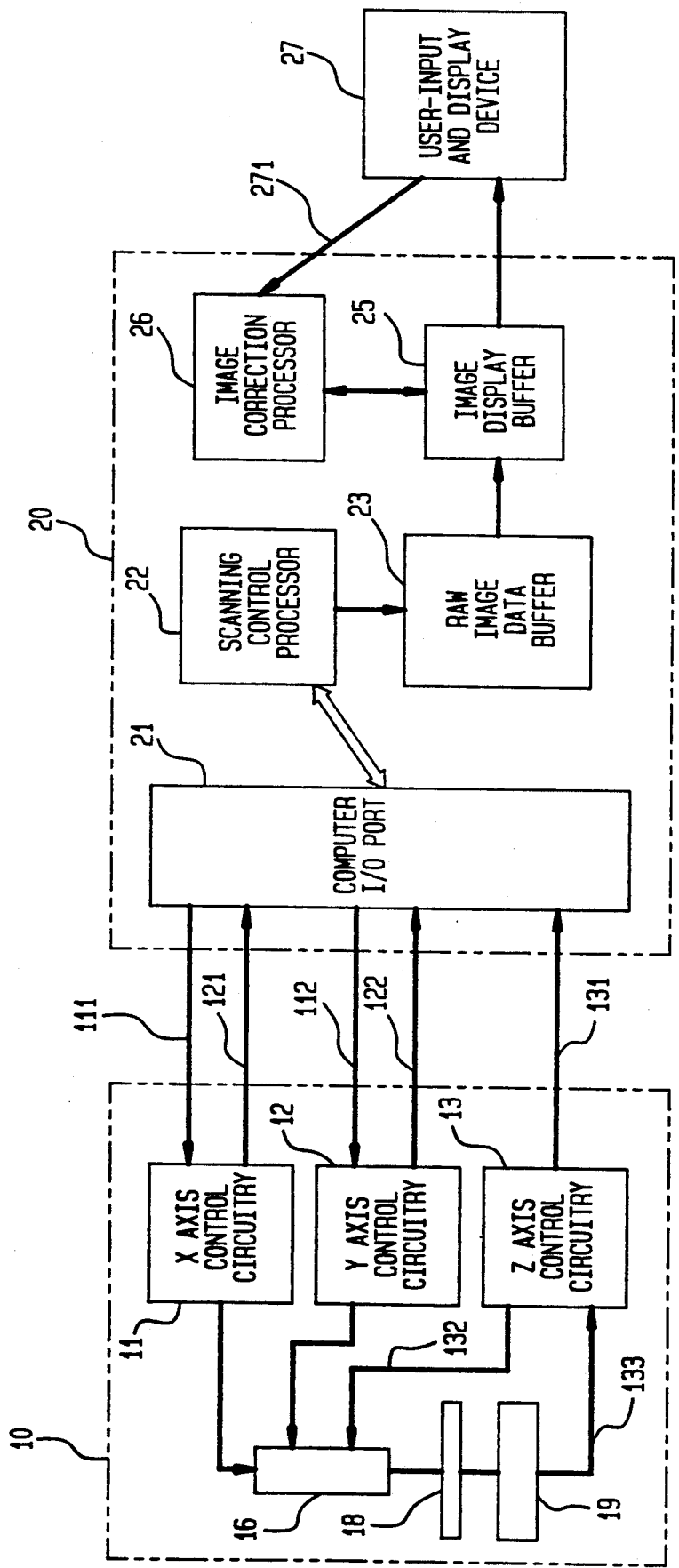
FIG. 1 is a functional block diagram of a STM image correction system.

One illustrative embodiment of a STM image distortion correction system in accordance with my invention is shown in FIG. 1; various control and other elements of an STM well known in the art but not specifically pertinent to my invention have not been illustrated but are understood to be present. My illustrative embodiment includes an STM 10 and a computer 20. In the STM 10, the tip 16 is raster scanned across the surface of interest 18. The x coordinate tip position in the x-y plane is controlled by the x axis control circuitry 11. The y coordinate tip position in the x-y plane is controlled by the y axis control circuitry 12. In this embodiment, both the x axis control circuitry 11 and the y axis control circuitry 12 are configured from the scanning control processor 22 in the computer 20 through the computer input/output port 21 via communication paths 111 and 112. Included within the x axis and y axis control circuits are counters used to keep track of the tip position in the x-y plan. The values of the counters are sent to the scanning control processor 22 through the computer input/output port 21 via communication paths 121 and 122. As the tip scans the surface of interest 18, the z axis control circuitry 13 receives feedback voltage on line 133 from the tunneling current sensing circuitry 19. The z axis control circuitry maintains the tunneling current constant by actuating the z axis piezoelectric transducer with a signal on line 132. The z axis control circuitry also provides signals to the computer 20 via communication path 131 indicating the z axis position of the scanning tip 16. The z axis tip position is communicated to scanning control processor 22 via the computer input/output port 21 and combined with the x-y plane tip position information to produce an image which is then recorded in the raw image data buffer 23. The image data can then be read into the image display buffer 25 and displayed on the user input and display device 27. In accordance with my invention, the image correction processor 26 manipulates the image to remove distortions by shifting and stretching the image's scan lines according to selected values of the parameters described below. The parameter values are selected by the user as input to the image correction processor 26 via communication path 271 from the user input and display device 27.

Figure 2:
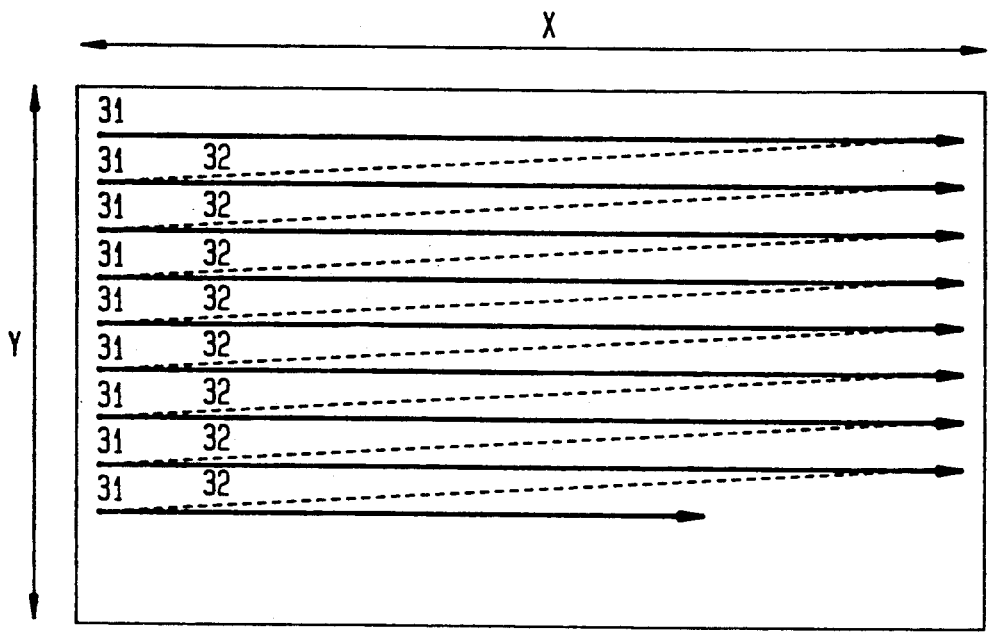
FIG. 2 depicts a one direction x-scan motion.
Figure 3:
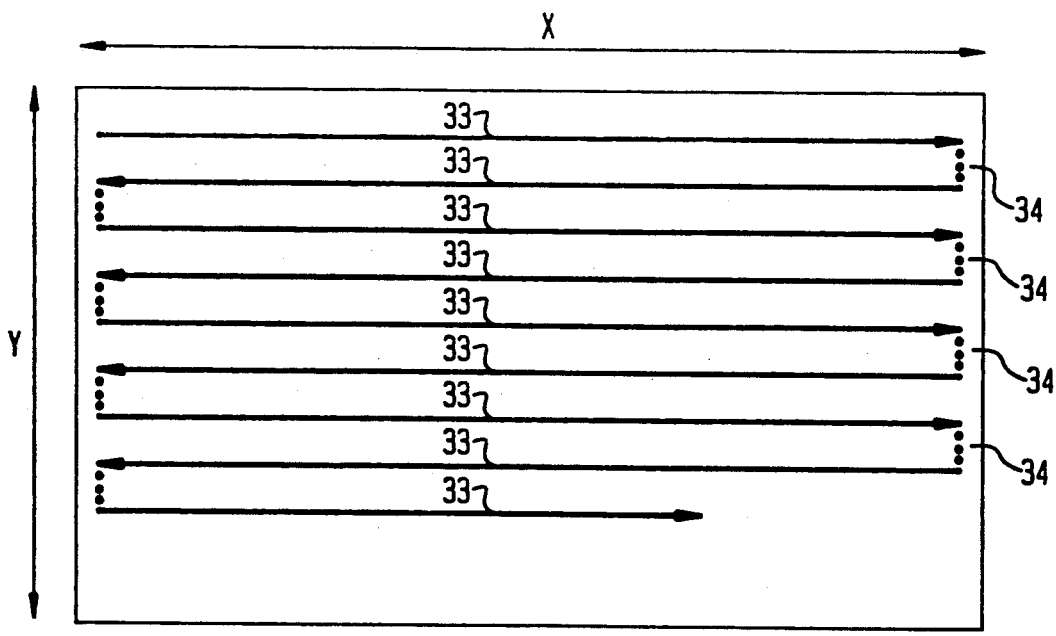
FIG. 3 depicts a continuous bi-directional scanning motion.

In prior art equipment, as discussed earlier, image data is typically collected in only one direction of the lateral scan. FIG. 2 shows this scan pattern over surface 18. As can be seen in FIG. 2, the solid lines 31 indicate data collection activity as the tip 16 moves along the x axis, while the dotted lines 32 indicate no data collection activity as the tip 16 moves to the beginning x coordinate position for the next line to be scanned located at the next y coordinate position. I have found that the creep in opposite scan directions tends to distort the image in a complimentary fashion. One aspect of my invention is to collect image data on the surface of interest 18 in both directions of the lateral scan as depicted in FIG. 3. The solid lines 33 indicate data collection activity as the tip moves along the x axis in one direction. The dotted lines 34 show the tip 16 moving along the y axis to the next line to be scanned. The solid lines 35 indicate data collection as the tip moves along the x axis in the opposite direction of line 33. A benefit of this aspect of my invention is that it permits faster image acquisition rates because the tip is not required to traverse the surface twice for each scan line acquired.

Figure 4:
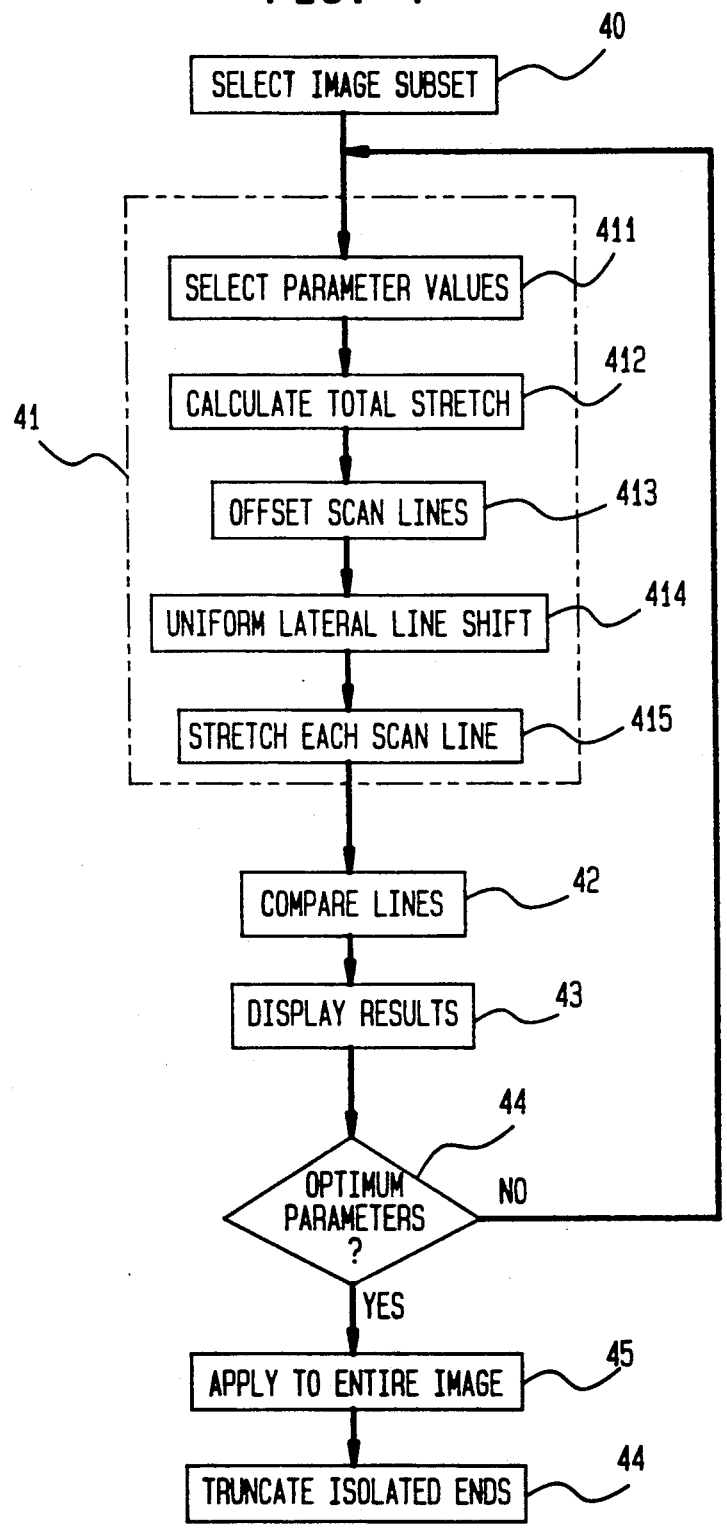
FIG. 4 is a flow diagram of a specific embodiment of my invention.
Figure 5:
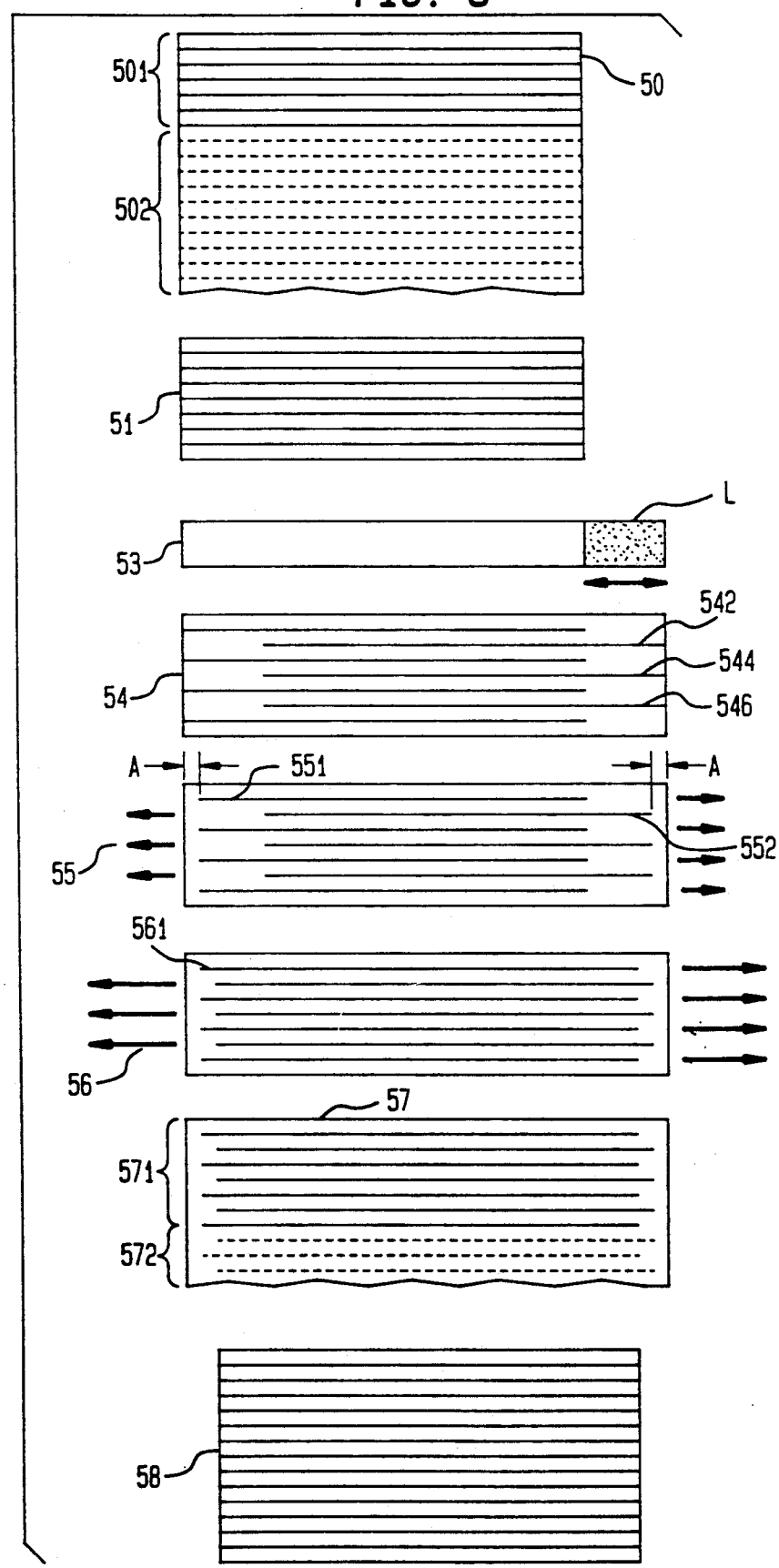
FIG. 5 illustrates the effect of the operations on the scan line information at various steps of the process in FIG. 4.

The image correction process performed in processor 26 for this specific embodiment of my invention is depicted in FIG. 4. FIG. 5 illustrates the effect of each step detailed in FIG. 4 on the scan line image data. To facilitate an understanding of the process described in the following discussion it is best to read the description below while looking at FIGS. 4 and 5 placed next to each other.

The first step 40 is to choose a subset of the scan line information. Using a subset of the image reduces the amount of processing necessary to operate on the image for each set of selected parameter values thereby allowing for interactive parameter value adjustments. From the image 50 the first 30 scan lines, shown as the solid lines 501, are chosen for processing. The dotted lines 502 are not processed initially and remain in the raw image data storage buffer 23. Image 51 shows the selected subset of scan lines before processing. The image stretching process 41 begins with step 411 which is to select values: for the linear shift parameter, herein known as A; for the linear stretch parameter, herein known as B; and for the exponential stretch parameter, herein known as C. Step 412 calculates the maximum expected total stretch of the image by applying the formula $S = Bx + \exp(Cx)$ to a scan line. This expected total stretch is shown as L in image 53. Step 413 offsets alternate scan lines in opposite directions. Image 54 shows solid lines 542, 544, 546, etc. moved to the leftmost margin. Step 414 shifts each line of the image 55 toward the center by the selected value for parameter A. For example, line 551 is moved distance A to the right and line 552 is moved distance A to the left. The distortion of the scan lines introduced by this step is complementary to the distortion caused by the creep in the response of the piezoelectric materials as the tip 16 moves along the x-axis. Step 415 stretches each scan line according to the expression $S = Bx + \exp(Cx)$.

Figure 6:
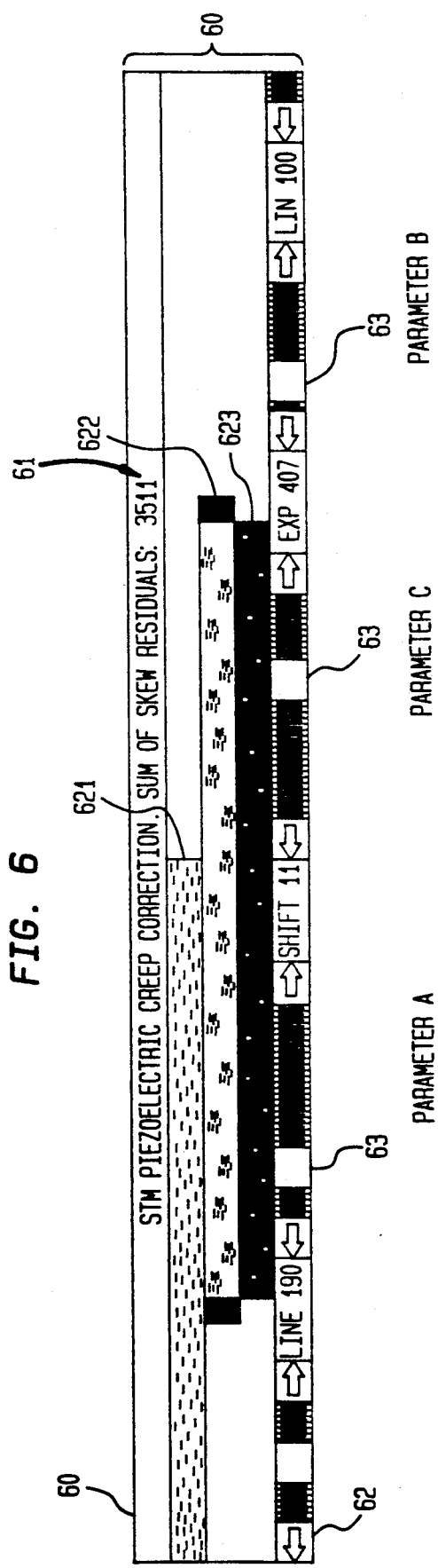
FIG. 6 depicts a specific embodiment of the user interface for displaying differences between scan lines after correction.

Each line comprises an array of individual pixels, such as 400 in a single line, with each pixel being the smallest data element measuring the height of the surface 18 being examined by the tip 16 at a given instant in the scan. Each pixel is located at a position x along the line. As step 415 stretches each scan line according to the expression $S = Bx + \exp(Cx)$, each individual pixel in the line is moved a different amount in the direction of the scan the distance S, where x as noted is the initial position of that particular pixel. As each pixel is moved and the line stretched, gaps between pixels appear. To fill the gaps intermediate pixels are inserted. In my present embodiment these pixels are duplicates of the moved pixel. However, the inserted pixels are determined by mathematical interpolation between pixels on either side of each gap. Image 56 shows the effect of the stretch on the lines. For example, line 561 is a stretched version of line 551. Once the image stretching process 41 is complete, step 42 compares adjacent lines by subtracting the value of a pixel in one line from the adjacent pixel in the adjacent line. These differences are quantified and displayed (step 43) to the user on display device 27. illustratively an Apple Macintosh, (FIG. 6). Step 44 requires a determination of whether parameter values chosen in step 411 as part of the image stretching process 41 best minimize the quantified differences between scan lines. If the determination in step 44 results in a conclusion that different parameter values would result in a lower quantified difference between scan lines, the image stretching process 41 is repeated with new parameter values.

FIG. 6 shows an example of a user display in accordance with my invention. This user display shown is a window 60 on an Apple Macintosh produced using standard Apple Macintosh system routines. Within this window 60 the quantified difference between scan lines is displayed as a sum of residuals 61 and is displayed as image 623 within the gray scale display 62. The gray scale display 62 contains two other images. Image 621 shows the selected 30 scans lines before correction. Image 622 shows the effect of the correction process A (41) applied to the 30 scan lines. The user looking at this display and image 623 decides if the parameter values chosen in step 411 of the image stretching process 41 resulted in adjustments to the scan lines that best minimizes the differences between scan lines. The optimum correction is indicated by a minimum calculated sum of residual value 61 and/or a uniform color in image 623. The user can input new parameter values into the image stretching process by sliding each of the scroll bars 63. There is a scroll bar for each of the parameters used to adjust the image. Because in this illustrative embodiment of the invention only a subset of the scan lines are at this point being processed, all corrections to the image are fast enough to be interactive. The user can vary the parameter values and see the resultant changes.

If the determination in step 44 results in the conclusion that the selected parameter values best minimize the differences between adjacent lines, the image stretching process 41 is applied to the entire image using these parameter values (step 45). Image 57 shows the affect of step 45. The solid lines 571 show the subset of scan lines. Dashed lines 572 show the addition of the rest of the scan lines in the image shifted and stretched by process 41. Finally, in step 46 the regions of the image where alternate lines do not overlap are cut. Image 58 is the final corrected STM image.

Clearly, those skilled in the art recognize that the computer 20 shown in FIG. 1 need not be connected or integrated into the STM 10 once an STM image is acquired and stored. The image correction system disclosed herein can operate separate from the STM. Those skilled in the art will recognize that the inventive system can include equivalent systems where the processing power of the computer 20 is sufficient to obviate the need to only operate on a subset of the image. Equivalent systems would extend to systems where the user is removed from the decision process for determining the best parameter values and replaced with an algorithm that optimizes the parameter values for minimizing the differences between scan lines. Equivalent systems would also extend to those systems where the processors identified in computer 20 are software processes operating in one general purpose processor.

What is claimed is:

1. A method for correcting images distorted by time dependent non-linear components of a scanning tunneling microscope, said images comprising pluralities of pixels in scan lines, said method comprising the steps of:

offsetting alternate scan lines of the image in opposite directions by a selected value of an offsetting parameter, stretching the length of each scan line according to a selected value for at least one stretching parameter, determining the difference between adjacent pixels on adjacent scan lines, varying said selected values of said offsetting and stretching parameters to determine the values that reduce said determined differences between adjacent pixels on adjacent scan lines, and applying said parameter values determined in said varying step to said offsetting and stretching steps to correct said distorted image.

2. The method as recited in claim 1 wherein each line is stretched according to the formula $S = Bx + \exp(Cx)$ where S is the amount of the stretch, x is the distance from the beginning of the line, and B and C are stretching parameters and the values of B and C are selected stretching parameter values.

3. The method as recited in claim 1 wherein said determining step includes representing said differences between adjacent scan lines as a sum of residuals.

4. The method as recited in claim 1 wherein said determining step includes visually representing said differences between adjacent scan lines as a gray scale display.

5. The method as recited in claim 1 wherein said steps are first operated on a subset of said scan lines and then said shifting and stretching steps are repeated for the total set of said scan lines.

6. The method as recited in claim 1 wherein said varying step includes inputting new values for said offsetting and stretching parameters.

7. An image correcting apparatus for a scanning tunneling microscope having a scanning tip and means for scanning over a surface while said scanning tip moves in the x-y plane and acquiring image data on lines scanned parallel to the x axis at various values for y with adjacent lines scanned in opposite directions, said apparatus comprising means for converting said scanned image data obtained from said microscope to digital image data, means for storing said image data, means for adjusting the scan lines of said image data according to selected values of an offsetting parameter and one or more stretching parameters, means for determining the differences in pixel values between adjacent scan lines, and means for varying said selected values of said offsetting and stretching parameters to minimize said determined differences between pixel values on adjacent scan lines.

8. The apparatus as recited in claim 7 wherein said means for adjusting said scan lines according to said offsetting and stretching parameters comprises the means for applying a linear shift to said scan lines alternately and in opposite directions according to the value of said offsetting parameter and means for stretching said scan lines according to the formula $S = Bx + \exp(Cx)$, where S is the amount of the stretch, x is the distance from the beginning of the scan line, and B and C are said stretching parameters and the values of B and C are said selected values of said stretching parameters.

9. The apparatus as recited in claim 7 wherein said means for determining said differences between pixel values on adjacent scan lines includes means for representing said differences as a sum of residuals.

10. The apparatus as recited in claim 7 wherein said means for determining said difference between pixel values on adjacent scan lines includes means for visually representing said differences as a gray scale display.

11. The apparatus as recited in claim 7 further including means for selecting a subset of the image for correction.

12. A method for correcting images from a scanning tunneling microscope, said images being defined by pluralities of individual pixel data elements in scanning lines which are scanned alternately in opposite directions, said method comprising the steps of offsetting alternate scan lines to limits of the image expected after said scanning lines are stretched, linear shifting alternate scan lines in opposite directions toward the center of the image to bring the lines ends into registering, stretching each of the scan lines to provide a linear distortion of the length of the individual/scan lines complementary to the distortion introduced into each image to be corrected by the scanning tunneling microscope, and adjusting the amounts of said linear shifting and said stretching to reduce differences between individual pixels on adjacent lines.

* * * * *